3,470,213
SULFOSUCCINATE SALT SOLUBILIZATION
OF FUMARIC ACID
David M. Marquis, Orinda, Calif., assignor to Chevron Research Company, San Francisco, Calif., a corporation of Delaware
No Drawing. Filed May 16, 1966, Ser. No. 550,137
Int. Cl. B01f 3/00; B01j 1/00
U.S. Cl. 252—363.5    3 Claims

ABSTRACT OF THE DISCLOSURE

Fast dissolving fumaric acid-sulfosuccinate salt compositions are obtained by spray-drying aqueous slurries of the acid and salt.

---

This invention relates to a method for increasing the solubility rate of fumaric acid in water. More particularly, it relates to an improved method for the substantial increase of the aqueous solution rate of fumaric acid requiring the addition of only minor amounts of non-acidic matter.

Fumaric acid is widely used in the art as an acidulation agent, as an antioxidant, as a dyeing mordant, and the like. It has a rather slow rate of solution in water and for many uses this characteristic is very inconvenient. Thus, a form of fumaric acid which is quick dissolving and reliably positive in promoting dissolution is particularly desirable. This, of course, suggests additives but those known and practiced in the art, which includes sugars, sodium chloride, ammonium chloride, and the like, frequently comprise an excessive portion of the solid, i.e., as much as 20 percent of the solid and more.

It has now been found that the substantially homogeneous incorporation of minor amounts of water soluble alkali metal or calcium sulfosuccinate salts into fumaric acid greatly increases the rate of dissolution of solid fumaric acid into water. Rates are increased by as much as a factor of $0.5 \times 10^2$ and higher.

By a minor amount is meant in parts by weight from about 0.1 to 5.0 parts per 99.9 to 95 parts, respectively, of sulfosuccinate salt and fumaric acid.

Sulfosuccinate salts of alkali metals in general and of calcium are contemplated. Those of sodium, potassium and calcium and their mixtures are preferred. The formula of these salts is

MeO$_2$CCH$_2$CH(CO$_2$Me)(SO$_3$Me)

in which Me represents the contemplated metal cations and may be the same or as in mixed salts, different cations.

In a preferred embodiment a high solids content slurry of fumaric acid in a volatile liquid, preferably water, is prepared, and for each 100 parts of fumaric acid from 1 to 2.5 parts of a sulfosuccinate such as sodium sulfosuccinate is added. The stirred slurry is then spray-dried in a conventional spray drying apparatus and the resulting powder collected for use. It is found to be free flowing and substantially nonhygroscopic and in general of a particle size which will pass through about a standard 80 mesh screen. At 60° F. fumaric acid prepared in this manner is fully dissolved within a period of one minute. It is especially suitable for use where rapid solubility in cold water is required.

The amount of sulfosuccinate salt which is effective for solubilization varies. As little as 0.1 weight percent results in an appreciable solubilization rate increase. On the other hand, the use of relative amounts substantially larger than about 2.5 parts per 97.5 parts of fumaric acid are not particularly desirable for purposes of solubilization because for all practical purposes solution rates are already highly satisfactory at the 2.5 part level. While larger amounts may be used, for example 40 parts per 60 parts of acid, such use is not usually economic and, of course, means the introduction of a larger amount of non-acidic material into the desired product. On the other hand, other water-soluble materials, such as table salt, sugar, flavoring, and the like, can be added to the sulfosuccinate-fumaric acid composition, so long as the above fumaric acid-sulfosuccinate compositional ratio is maintained, and yet enjoy fast solution rates.

A better understanding of the invention will be obtained from the following illustrative examples:

EXAMPLE 1

To a slurry of 500 grams of powdered fumaric acid in 500 grams of water were added 10 grams of sodium sulfosuccinate. The mixture was throughly stirred and spray-dried in a laboratory spray drier. The resulting powder was free flowing and non-hygroscopic. It all passed an 80 mesh screen and had no appreciable amount of undesirable fines.

EXAMPLE 2

Solubilization test

The rate of solubility of the product of Example 1 was tested by adding 0.17 part of the fumaric-sulfosuccinate composition to 100 parts of water at 60° F. under comparable conditions of stirring and timing and the following results noted:

| Fumaric acid: | Time to dissolve, min. |
|---|---|
| (1) Untreated fumaric | [1] 120 |
| (2) Sodium sulfosuccinate | 1 |

[1] Little or no fumaric acid had dissolved.

EXAMPLE 3

A portion of untreated fumaric acid was placed in water as in Example 2 above except that sodium sulfosuccinate had been previously dissolved in the water. The weight ratio of the sulfosuccinate salt to fumaric acid was 2.5:97.5. Under the above test conditions and after 120 minutes, no apparent amount of the acid had dissolved.

EXAMPLE 4

A slurry of fumaric acid in an aqueous solution of sodium sulfosuccinate as in Example 3 was evaporated to dryness on a steam plate under mild conditions such that until evaporation was completed there remained a slurry at all times. The resulting powder was free flowing and non-hygroscopic. Under the conditions of the above solubilization test, no appreciable solubility could be noted after 120 minutes.

EXAMPLE 5

A portion of the product of Example 4 was ground to further reduce the particle size and tested as above. The results were essentially as in Example 4.

The above examples illustrate that the incorporation of minor amounts of alkaline sulfosuccinate salts into solid fumaric acid greatly increased the solid acid solubility rate. A mere surface layer of the sulfosuccinate is shown to be inadequate.

Spray drying of an aqueous slurry is a preferred means of obtaining a substantially homogeneous mixture for several reasons including the relatively short time at elevated temperatures and the relatively small amount of liquid which must be eliminated as compared to total solutions.

EXAMPLE 6

Portions of the product of Example 1 were stored in conventional stoppered containers for about 6 months for the purpose of testing the storage characteristics thereof. No change in color or odor could be discerned from the storage.

EXAMPLE 7

Toxicological data

The product produced as in Example 1 was tested by feeding test animals (mice). The $LD_{50}$ was found to be 26.4 grams per kilogram body weight.

EXAMPLE 8

Tests were made in human patch tests on ten subjects. Two of the subjects were known to have shown previously exceptionally sensitive reactions to materials conventionally classified as non-irritating. Concentrations of from 0.1 to 40% were used in the test. No evidence was found for any skin irritation in these tests.

EXAMPLE 9

Ocular irritation tests using rabbits were found to cause a mild inflammation. The reaction was short in duration. No permanent damage could be detected.

The above Examples 7–9, inclusive, tend to establish that fumaric acid as modified in the subject process has little, if any, mammalian toxicity when used in reasonable amounts.

I claim:

1. The process for the production of fumaric acid having an improved rate of solubility in water consisting essentially of adding fumaric acid and a minor amount of a sulfosuccinate salt of the formula $$MeO_2CCH_2CH(CO_2Me)(SO_3Me)$$

wherein said Me are the same or different and are selected from the group consisting of sodium, potassium and calcium cations to water, thereby producing an aqueous slurry, spray drying said slurry and recovering the resulting powder.

2. The composition obtained by spray drying a mixture consisting essentially in parts by weight in the ratio of from about 0.1 to 5.0 parts of an alkali metal sulfosuccinate with from about 99.9 to 95 parts of fumaric acid and at least sufficient water to form a slurry, said sulfosuccinate being of the formula $$MeO_2CCH_2CH(CO_2Me)(SO_3Me)$$

wherein said Me are the same or different, thereby producing a solid substantially non-hygroscopic free-flowing powder containing fumaric acid and said salt in said ratio.

3. The composition as in claim 2 wherein said sulfosuccinate salt is sodium sulfosuccinate.

References Cited

UNITED STATES PATENTS

| | | | |
|---|---|---|---|
| 3,250,624 | 5/1966 | Van Ness | 99—78 |
| 3,328,314 | 6/1967 | Marquis | 252—383 |

HERBERT B. GUYNN, Primary Examiner

D. L. ALBRECHT, Assistant Examiner

U.S. Cl. X.R.

8—100; 99—78; 252—383, 407; 260—537